(12) United States Patent
Busch et al.

(10) Patent No.: US 8,499,545 B2
(45) Date of Patent: Aug. 6, 2013

(54) OPERATING AND DIAGNOSTIC METHOD FOR AN SCR EXHAUST-GAS AFTERTREATMENT SYSTEM

(75) Inventors: Michael-Rainer Busch, Ebersbach (DE); Dirk Herbstritt, Durmersheim (DE); Uwe Hofmann, Reichelsheim (DE)

(73) Assignee: Daimler AG, Stuttgart (DE)

( * ) Notice: Subject to any disclaimer, the term of this patent is extended or adjusted under 35 U.S.C. 154(b) by 537 days.

(21) Appl. No.: 12/675,930

(22) PCT Filed: Aug. 13, 2008

(86) PCT No.: PCT/EP2008/006640
§ 371 (c)(1),
(2), (4) Date: Sep. 10, 2010

(87) PCT Pub. No.: WO2009/030346
PCT Pub. Date: Mar. 12, 2009

(65) Prior Publication Data
US 2010/0326051 A1    Dec. 30, 2010

(30) Foreign Application Priority Data

Aug. 28, 2007  (DE) .......................... 10 2007 040 439

(51) Int. Cl.
*F01N 9/00*    (2006.01)
(52) U.S. Cl.
USPC ................... 60/277; 60/274; 60/276; 60/286; 60/301; 60/303
(58) Field of Classification Search
USPC ............................. 60/276, 277, 286, 303, 301
See application file for complete search history.

(56) References Cited

U.S. PATENT DOCUMENTS

| 2007/0113544 A1* | 5/2007 | Nishina et al. .................. 60/286 |
| 2007/0266697 A1 | 11/2007 | Nishina et al. |

FOREIGN PATENT DOCUMENTS

| DE | 102 54 843 A1 | 6/2004 |
| EP | 1 225 323 A1 | 7/2002 |

(Continued)

OTHER PUBLICATIONS

International Search Report dated with English translation dated Dec. 9, 2008 (Four (4) pages).

(Continued)

*Primary Examiner* — Kenneth Bomberg
*Assistant Examiner* — Brandon Lee
(74) *Attorney, Agent, or Firm* — Crowell & Moring LLP

(57) ABSTRACT

In an operating and diagnostic method for an SCR exhaust gas aftertreatment system which has an SCR catalytic converter with ammonia storage capacity, a signal of an exhaust gas sensor that is sensitive to nitrogen oxide and ammonia and is arranged downstream of the SCR catalytic converter, is measured. In a normal operating mode, ammonia is supplied to the SCR catalytic converter corresponding to a filling level model for ammonia stored in the SCR catalytic converter, in such a way that the ammonia filling level of the SCR catalytic converter is held at least approximately at a predefinable nominal value (or value range). The normal operating mode is interrupted if an exhaust gas sensor signal that exceeds a predefinable first limit value, is registered, and the set urea dosing rate is increased by a predefinable degree in relation to the value provided in the normal operating mode. Thereafter, a return is made to the normal operating mode, or a switch is made to a diagnostic operating mode, as a function of the profile of the signal of the exhaust gas sensor.

7 Claims, 3 Drawing Sheets

FOREIGN PATENT DOCUMENTS

| | | |
|---|---|---|
| FR | 2 838 161 A1 | 10/2003 |
| JP | 2001-214736 A | 8/2001 |
| JP | 2003-293743 A | 10/2003 |
| JP | 2004-176719 A | 6/2004 |
| WO | WO 2006/067900 A1 | 6/2006 |
| WO | WO 2007037730 A1 * | 4/2007 |

OTHER PUBLICATIONS

PCT/ISA/237 (Six (6) pages).
Decision of Registration in related Japanese Patent Application No. 2010-522215 dated Oct. 23, 2012.

* cited by examiner

OPERATING AND DIAGNOSTIC METHOD FOR AN SCR EXHAUST-GAS AFTERTREATMENT SYSTEM

BACKGROUND AND SUMMARY OF THE INVENTION

This application is a national stage of PCT International Application No. PCT/EP2008/006640, filed Aug. 13, 2008, which claims priority under 35 U.S.C. §119 to German Patent Application No. 10 2007 040 439.7, filed Aug. 28, 2007, the entire disclosure of which is herein expressly incorporated by reference.

The present invention relates to an operating and diagnostic method for an SCR (selective catalytic reduction) catalytic converter with an SCR exhaust gas aftertreatment system having an ammonia storage capacity.

German patent document DE 102 54 843 A1 disclosed an operating and diagnostic method for an SCR catalytic converter with an SCR exhaust gas aftertreatment system having an ammonia storage capacity, where a signal of an exhaust gas sensor arranged downstream of the SCR catalytic converter in an exhaust gas line of the internal combustion engine is sensed with a sensitivity with regard to nitrogen oxide and ammonia. The amount of the reduction agent supplied to the SCR catalytic converter is changed for diagnosing the SCR exhaust gas aftertreatment system and an error is recognized, if the signal does not change as expected. While this method indeed permits a recognition of a malfunctioning of the SCR exhaust gas aftertreatment system in a reliable manner, it is relatively unspecific.

One object of the present invention, therefore, is to provide an operating and diagnosing method, which enables reliable operation and improved error treatment.

This and other objects and advantages are achieved by the operating and diagnostic method according to the invention, for an SCR exhaust gas aftertreatment system with an SCR catalytic converter with ammonia storage capacity, in which method an exhaust gas sensor with a sensitivity to nitrogen oxide and ammonia is used downstream of the SCR catalytic converter. In a normal operating mode, ammonia is supplied to the SCR catalytic converter corresponding to a filling level model for ammonia stored in the SCR catalytic converter, in such a way that the ammonia filling level of the SCR catalytic converter (5) is held at least approximately at a predefinable nominal value or in a predefinable nominal value range. By means of the exhaust gas sensor with sensitivity to nitrogen oxide and ammonia, the nitrogen oxide conversion capacity of the SCR exhaust gas aftertreatment can thereby be sensed on the one hand, while on the other hand, the ammonia filling level of the catalytic converter relevant for the nitrogen oxide can be controlled. In this manner, an optimum operation of the SCR exhaust gas aftertreatment system and an error diagnostics are enabled. An insufficient nitrogen oxide conversion or an underdosing of urea is noted by means of an increased nitrogen oxide concentration and possibly corrected by adjusting the urea dosing. A reduced ammonia storage capacity of the SCR catalytic converter or an overdosing is noted by means of an increased ammonia concentration and if necessary also corrected by adjusting the urea dosing.

For optimum operation of the SCR exhaust gas aftertreatment system, a distinct interpretation of the exhaust gas sensor signal is however advantageous, which can occasionally cause difficulties. These difficulties can be met by the procedure according to the invention to interrupt the normal operating mode, if a signal of the exhaust gas sensor is registered which exceeds a predefinable first limit value. The first limit value is preferably given corresponding to a critical nitrogen oxide or ammonia concentration and is preferably in a region between 5 ppm and 50 ppm.

If the first limit value is not exceeded in the normal operating mode, the SCR exhaust gas aftertreatment system operates properly, and there is generally no reason to interrupt the normal operating mode. In the case of an exceeded first limit value, a disturbance is however detected, which is analyzed further according to the invention. That is, according to the invention, if a signal of the exhaust gas sensor is registered as exceeding a predefinable first limit value, the normal operating mode is interrupted, and a urea dosing rate set by the urea dosing device is increased by a predefinable measure compared to the value in the normal operating mode. In the following one changes over into a diagnostic operating mode, if the signal of the exhaust gas sensor increases above a second predefinable limit value which exceeds the first limit value in a predefinable period. The signal profile of the exhaust gas sensor in reaction to the increased urea dosing rate is thus evaluated and it is decided by means of the evaluation, to what extent the initially detected disturbance will need a further diagnosis. The signal of the exhaust gas sensor can be a raw signal or a conditioned output signal of the exhaust gas sensor in the sense of a conventional signal conditioning, which in any case correlates with a nitrogen oxide or ammonia concentration in the exhaust gas.

In the arrangement of the invention, a return is made to the normal operating mode, if the signal of the exhaust gas sensor falls below a predefinable third limit value lying below the first limit value in the predefinable period after the increase of the set urea dosing rate. The falling of the exhaust gas sensor signal seen as correlating with the nitrogen oxide concentration results as a normal reaction of properly working SCR exhaust gas aftertreatment system, in which an improved nitrogen oxide conversion takes place due to an increased offer of urea or ammonia. The SCR exhaust gas aftertreatment system is thus seen to be in proper order in principle, and typically no further error treatments are made, apart from adjustments of the urea dosing which possibly have to take place.

In a further arrangement, a malfunctioning urea dosing device is diagnosed, if the signal of the exhaust gas sensor remains in a predefinable value range including the first limit value in the predefinable period. It is preferably provided to issue an alarm relating to this in this case to cause a service of the urea dosing device. With regard to a dimensioning of the value region which is significant for this, it is especially advantageous, if, in a further arrangement of the invention, this value region is limited by the second limit value to the top and by the third limit value to the bottom. In this manner, a specific differentiation for expected reactions of the exhaust gas sensor is achieved for a urea dosing rate set as increased.

In the case of an exhaust gas sensor signal exceeding the second limit value as a reaction to a urea dosing rate set as increased, a serious disturbance is first assumed, wherein one changes over into the diagnostic mode according to the invention. In the diagnostic operation mode, a catalytic converter characteristic characterizing an updated nitrogen conversion activity is determined in a further arrangement of the invention. The catalytic converter characteristic to be determined is advantageously a nitrogen oxide conversion or a catalytic converter property on hand, as for example the ammonia storage capacity.

If a deviation of the catalytic converter characteristic determined in the diagnostic operating mode from a predefined reference value is determined, an error notification is generated in a further arrangement of the invention, if the deviation is larger than a predefined difference value. An adjustment of the filling level model to the changed catalytic converter characteristic is preferably carried out if the deviation is smaller than the predefined difference value and/or larger than a predefined second lower difference value. The reference value thereby conveniently corresponds to the catalytic converter characteristic of a SCR catalytic converter in an orderly state. The reverse case is also seen to be included thereby, where the reference value corresponds to a limit-value malfunctioning catalytic converter, where the critical difference to an orderly catalytic converter characteristic is already considered.

In a further arrangement of the invention, an internal combustion engine operation with an increased nitrogen oxide raw emission compared to the normal operation is temporarily set in the diagnostic operating mode and the urea dosing rate is reduced in a chronologically synchronous manner or is set to zero. By the increase of the nitrogen oxide supply rate to the catalytic converter with reduced or cut-off urea dosing or ammonia supply and simultaneous monitoring of the exhaust gas sensor signal, the conversion activity of the catalytic converter can be diagnosed. Due to the previous increase of the urea supply rate, it can thereby be assumed that the SCR catalytic converter is supplied optimally with ammonia at the start of the increased nitrogen oxide supply rate and is operated at the best point with regard to this. A specific reference state is thus given for the test of nitrogen oxide activity for the SCR catalytic converter, which enables an especially reliable diagnosis In a further arrangement, the internal combustion engine operation with an increased nitrogen oxide raw emission is ended, and returned into the normal operating mode, if the signal of the exhaust gas sensor exceeds a predefinable fourth limit value after increasing the nitrogen oxide raw emission. Due to the increased nitrogen oxide offer with a simultaneous reduction or cutoff of the ammonia offer, the SCR catalytic converter has to deal with a nitrogen oxide conversion solely by previously stored ammonia. A using up of this stored ammonia supply thus inevitably leads to an increased nitrogen oxide concentration in the exhaust gas leaving the SCR catalytic converter after some time to be detected by the exhaust gas sensor. For a diagnosis, it is preferred in connection with this procedure according to the invention, if the period until reaching the fourth limit value or the nitrogen oxide amount offered and/or converted in the period are assessed. The nitrogen oxide amount converted within the period is proportional to the amount of the ammonia made available by the SCR catalytic converter in a stored form, which is why the ammonia storage capacity of the SCR catalytic converter can be determined and assessed.

Other objects, advantages and novel features of the present invention will become apparent from the following detailed description of the invention when considered in conjunction with the accompanying drawings.

DETAILED DESCRIPTION OF THE DRAWINGS

Figure 1:
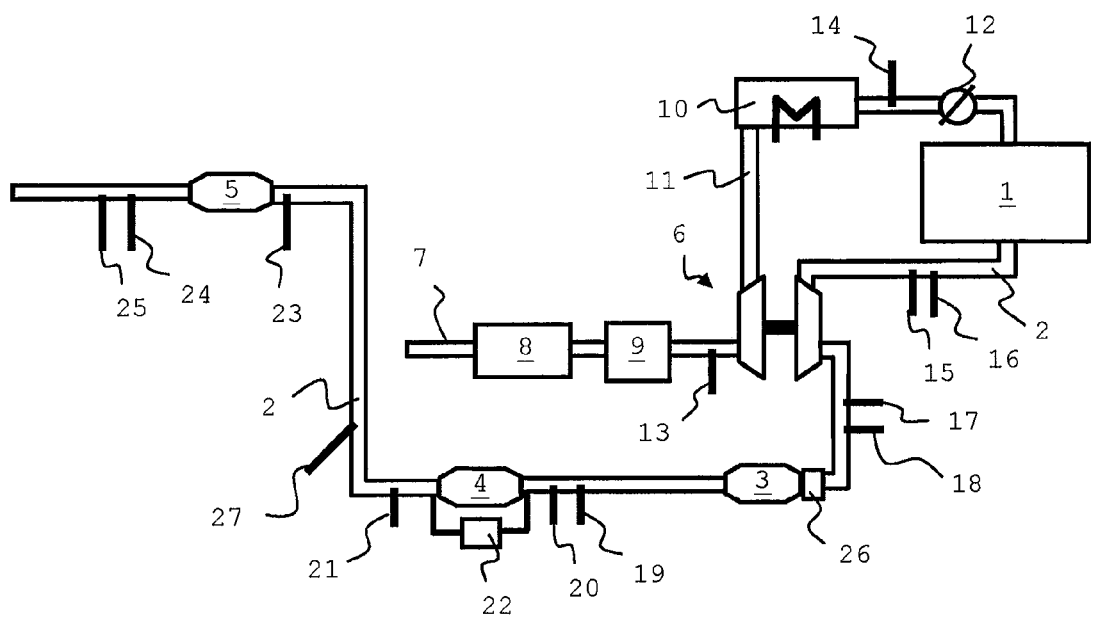
FIG. 1 is a schematic block diagram of an internal combustion engine with an exemplary embodiment of an associated SCR exhaust gas aftertreatment system.

FIG. 1 is a schematic block diagram of a representative embodiment of an internal combustion engine with an associated SCR exhaust gas aftertreatment system. The internal combustion engine 1 is preferably formed as an air-compressing internal combustion engine, in the following simply called Diesel engine. The exhaust gas ejected from the Diesel engine 1 is received by an exhaust gas line 2 and successively flows through an oxidation catalytic converter 3, a particle filter 4 and a SCR catalytic converter 5. A heating element 26 can optionally be arranged on the input side of the oxidation catalytic converter 3 in the exhaust gas line 2 for heating the oxidation catalytic converter 3 or the exhaust gas. Alternatively or additionally to the heating element 26, a fuel supply device can also be provided upstream of the oxidation catalyst 3. A heating of the exhaust gas by the heating element 26 or by exothermal oxidation of added fuel by the oxidation catalytic converter 3 is especially considered during a regeneration of the particle filter 4 by soot combustion. For determining the necessity of such a regeneration, a difference pressure sensor 22 is associated with the particle filter 4, via whose output signal a critical particle load of the particle filter 4 can be determined. An exhaust heating can however also be determined in connection with a cold start or warmup of the Diesel engine 1 and/or generally then, if an exhaust gas temperature level which is too low is determined especially on the input side of the SCR catalytic converter 5. An increase of the nitrogen dioxide part of nitrogen oxides present in the exhaust gas is also enabled by the oxidation calatytic converter 3. An oxidation of soot deposited in the particle filter 4 at exhaust gas temperatures below 500° C. is thereby enabled on the one hand, and also an improved nitrogen oxide conversion in the SCR catalytic converter 5.

An exhaust gas turbocharger 6 is further assigned to the Diesel engine 1, whose turbine is driven by the exhaust gas flow and whose compressor supplies air to the Diesel engine 1 taken in via an air supply line 11 via a an intake air line 7. For adjusting the air amount supplied to the Diesel engine 1, a throttle 12 is arranged in the air supply line 11. For cleaning the intake air of for measuring the intake air amount, an air filter 8 or an air mass meter 9 are arranged in the intake air line 7. A charge-air cooler 10 arranged in the air supply line 11 cools compressed intake air.

A supply point with a dosing valve 27 for supplying a reduction agent into the exhaust gas is arranged upstream of the SCR catalytic converter 5. The supply of the dosing valve 27 with the reduction agent takes place by means of a dosing pump from a container, which is not shown in detail. It is assumed in the following that the reduction agent is aqueous urea solution. However, another reduction agent can also be used, especially one which contains ammonia ($NH_3$) in a free or chemically bonded manner. The urea solution is dosed to the exhaust gas according to requirement via the dosing valve 27 by means of a nitrogen oxide removal provided by means of the SCR catalytic converter 5. Ammonia is released in the hot exhaust gas by thermolysis and/or hydrolysis, which acts selectively with regard to the reduction of nitrogen oxides contained in the exhaust gas.

For controlling the operation of the SCR exhaust gas aftertreatment system and of the Diesel engine 1, a control device is provided, not shown in FIG. 1. The control device has information about operating state variables of the Diesel engine 1 for fulfilling the provided control functions; for example, information about the issued torque or the speed. The control device preferably comprises a calculating unit and a storage unit and an input-output unit. The control device is thereby capable to carry out complex signal processing processes and to detect the operation of the Diesel engine 1 and of the SCR exhaust gas aftertreatment system and to control or regulate it. Characteristics necessary for this are preferably deposited in the storage device, wherein an adaptive adjustment of the characteristics can also be provided. The characteristics mainly relate to the relevant state variables of the exhaust gas, such as mass flow, raw emission, temperature in dependence on the operating state variables of the Diesel engine 1 such as load, speed, air ratio number etc. Further, characteristics for the relevant state variables of the oxidation catalytic converter 3, the particle filter 4 and the SCR catalytic converter 5 are provided. With regard to the SCR catalytic converter 5, these characteristics especially relate to the nitrogen oxide conversion and the ammonia capacity in dependence on the influential variables relevant for this.

The sensing of the operating states of the Diesel engine 1 and of the SCR exhaust gas aftertreatment system and the associated units preferably takes place by means of suitable sensors. In FIG. 1 are for example shown pressure sensors 13 and 15 for a pressure in front of the compressor and a pressure in front of the turbine of the turbocharger 6 and temperature sensors 14, 16, 18, 19, 21, 23 and 24 for respectively a temperature after the charge-air cooler 10, in front of the turbine, in front of the oxidation catalytic converter 3, in front and behind the particle filter 4, and in front and behind the SCR catalytic converter 5. Further sensors, especially for sensing exhaust gas components, can also be provided. A lambda sensor 17 and a nitrogen oxide sensor 20 for the nitrogen oxide content are for example provided in the exhaust gas. Especially, an exhaust gas sensor 25 sensitive to nitrogen oxides and ammonia is provided on the output side of the SCR catalytic converter 5. The nitrogen oxide sensor 20 can also be arranged downstream of the particle filter 4, but is preferably upstream the dosing valve 27. The signals of the sensors are processed by the control unit, so that the essential state variables are present at any time, and the operating point of the Diesel engine 1 can be changed if necessary in such a manner that an optimum operation of the SCR exhaust gas aftertreatment system is enabled.

The explained embodiment of a SCR exhaust gas aftertreatment system has proven to be particularly advantageous with regard to the removal of the essential exhaust gas contaminants, especially with regard to nitrogen oxides and particles. Additional exhaust gas cleaning components, as for example a nitrogen oxide storage catalytic converter and/or a hydrolysis catalytic converter can be provided in front of the SCR catalytic converter 5, or a further oxidation catalytic converter. Changes of the sensor system with regard to the type, number and arrangement of the sensors are also possible.

Figure 2:
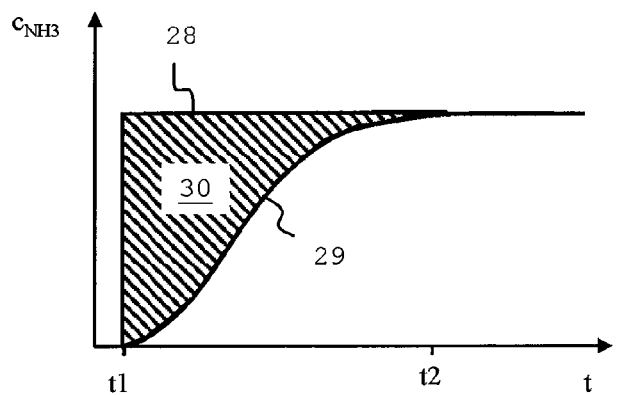
FIG. 2 is a diagram which shows the ammonia storage capacity of a SCR catalytic converter.
Figure 3:
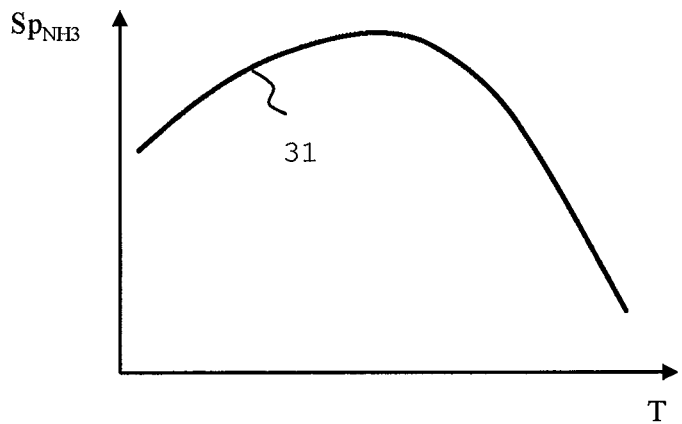
FIG. 3 is a diagram which shows the temperature dependence of the ammonia storage capacity of a SCR catalytic converter.
Figure 4:
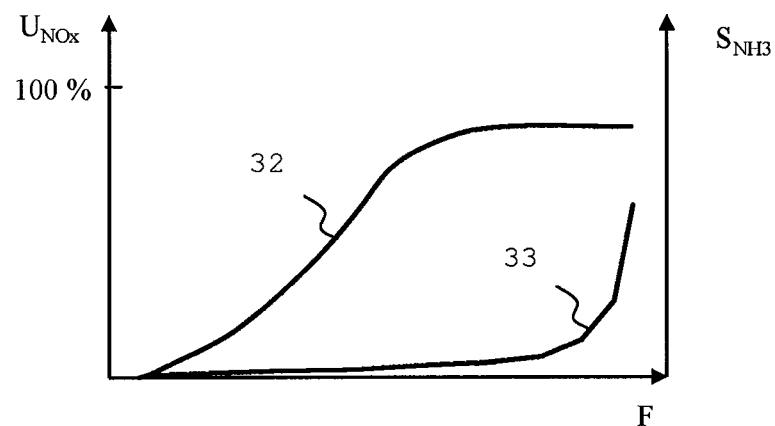
FIG. 4 is a diagram which shows the dependence of nitrogen oxide conversion and ammonia slip on the ammonia filling level of a SCR catalytic converter.

In the following, some important properties of this catalytic converter with regard to the FIGS. 2 to 4 are explained. It is assumed that the SCR catalytic converter 5 is a typical SCR catalytic converter with ammonia storage capacity, preferably formed as a layered catalytic converter with a zeolite layer carried by a ceramic carrier. An embodiment as a full extrudate catalytic converter on the basis of $TiO_2$-, $WO_3$-, $V_2O_5$ is also possible.

In FIG. 2 a diagram for ammonia storage capacity is shown, in which a typical chronological profile $c_{NH3}(t)$ of ammonia concentrations $C_{NH3}$ is shown with a charging of the SCR catalytic converter 5 with ammonia. It is thereby assumed that a SCR catalytic converter 5 free of stored ammonia is charged under isothermal conditions at the time t1 with an exhaust gas input flow of a predefined and temporarily constant magnitude and ammonia input concentration, which is represented by the trace 28. The SCR catalytic converter 5 receives ammonia in a chronologically reducing measure according to its ammonia storage capacity in the time between t1 and t2. The $NH_3$ concentration in the exhaust gas flow leaving the SCR catalytic converter 5 remains behind the input concentration, which is represented by the trace 29. At the time t2, the SCR catalytic converter 5 is saturated, this is why it cannot store any more ammonia and the trace 29 discharges into the trace 28. The ammonia filling level has then reached the maximum value of 100%. The amount of ammonia stored thereby by the SCR catalytic converter 5, which represents the absolute ammonia storage capacity under the corresponding conditions, is represented by the magnitude of the surface 29 between the two traces 28, 29.

The ammonia storage capacity is predominantly temperature-dependent, which is shown by the diagram shown in FIG. 3. The trace 31 thereby represents a typical profile of the temperature-dependent ammonia storage capacity $Sp_{NH3}(T)$. The ammonia storage capacity SpNH3 (T) is, as can be seen in the diagram of FIG. 3, comparatively high with low temperatures T and decreases with high temperatures T approximately above 300° C. A dependence on the gas throughput also exists, which in not shown in detail.

The ammonia filling level of the SCR catalytic converter can be given as an absolute measuring magnitude, and as a relative magnitude, which gives the stored ammonia amount in relation to the maximum storable absolute ammonia amount under the respective conditions according to the shown relations.

An important aspect in connection with the properties of a typical SCR catalytic converter 5 relates to the dependence of the nitrogen conversion on the ammonia filling level. In FIG. 4, this dependence is shown schematically by the trace 32. Compared to this, the dependence of the ammonia slip $S_{NH3}$ on the ammonia filling level is given by the trace 33. With an increasing filling level F, the nitrogen oxide conversion $U_{NOx}$ (F) increases thereby with an incline flattening out continuously up to a maximum value, which is essentially determined by the gas throughput and the temperature. This means that, from a certain value for the ammonia filling level F, the nitrogen oxide conversion $U_{NOx}$ cannot be increased further or not considerably by a further storage of ammonia in the catalytic converter. Rather, the ammonia slip $S_{NH3}$ increases, as is shown by the trace 33. When adjusting an optimum value for the respective conditions for the ammonia filling level F, the consideration of these facts is of importance.

The further schematical and possibly further dependencies dependencies shown in FIGS. 2 to 4 are conveniently represented for the SCR catalytic converter 5 in the form of characteristic lines or characteristics. The control device can access these, so that the state of the SCR catalytic converter 5 can be determined comprehensively for each operating state. It is thereby preferable to provide a characteristics set for an unaged new state and a further characteristics set for a defined aging state, preferably corresponding to a given limit aging. It is particularly advantageous to assign a first aging factor of for example zero to the unaged state and a second aging factor of for example one to the limit aging state. As explained in the following in more detail, during the operation of the Diesel engine 1, a diagnostic routine is provided, via which the updated aging state of the nitrogen oxide catalytic converter 5 is estimated from time to time. It is thereby preferably provided to assign an updated aging factor to the updated aging state, which is between zero and one corresponding to the above definition. When accessing characteristics data, it is then interpolated corresponding to the aging factor preferably linearly between the data of the characteristic sets to the new state and the limit aging state.

For removing nitrogen oxide by the SCR catalytic converter 5, it is provided to supply this with ammonia by correspondingly controlled actuation of the dosing valve 27 according to a filling level model for ammonia stored in the SCR catalytic converter 5 in such a manner that the ammonia filling level F of the SCR catalytic converter 5 is kept at least approximately on a predefinable nominal value or in a predefinable nominal value range. For the filling level model, the dependencies corresponding to the above explanations are preferably considered. A high nitrogen oxide conversion $U_{NOx}$ is thereby aimed for or set on the one hand, and an ammonia slip $S_{NH3}$ which is as low as possible or which can be neglected. The urea dosing rate is thereby determined by a urea dosing device (not shown) which comprises the dosing valve 27 and a filling level determination unit.

Figure 5:
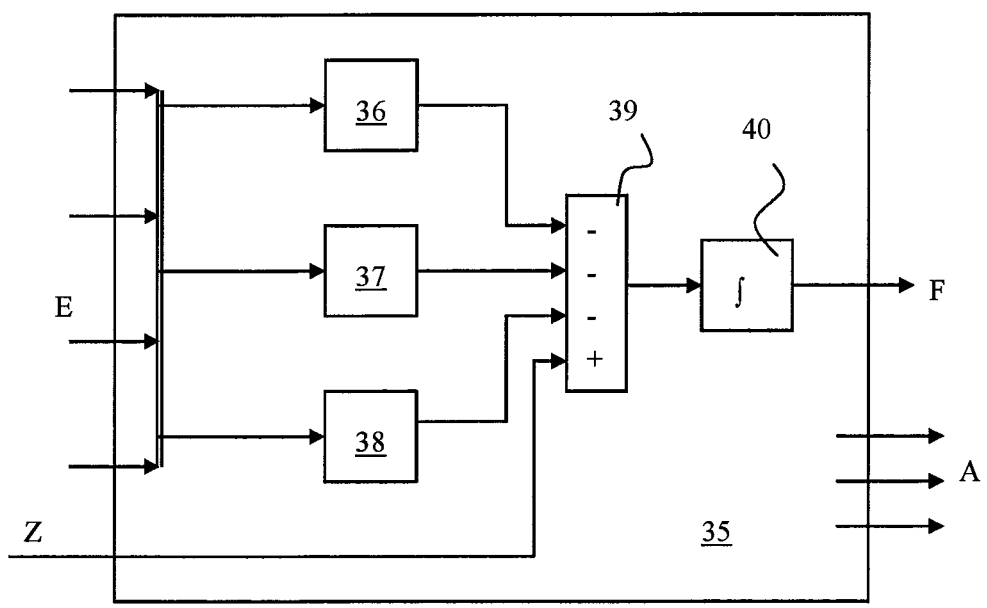
FIG. 5 is a schematic block diagram of an advantageous embodiment of a filling level determination unit for determining the ammonia filling level of the SCR catalytic converter associated with the SCR exhaust gas aftertreatment system.

In FIG. 5 is shown an advantageous arrangement of a filling level determination unit 35 for determining the ammonia filling level F of the SCR catalytic converter 5 schematically in a block diagram form. The filling level determination units 35 converts a mathematical filling level model with fallback to stored characteristic lines or characteristics and sensor signals corresponding to the above explanations and determines the updated ammonia filling state F of the SCR catalytic converter 5 and activation variables, especially for activating the dosing valve 27. The filling level determination unit 35 obtains input variables E for this, which for example relate to sensorically sensed exhaust gas state variables such as the gas temperature, the nitrogen oxide content of the SCR catalytic converter 5, and the exhaust gas mass flow in addition to an updated aging factor. Further relevant variables, as especially the output signal of the exhaust gas sensor 25 are not listed completely for simplicity. The filling level determination unit 35 comprises characteristic sets 36, 37, 38 for the nitrogen oxide conversion, a direct conversion of ammonia with oxygen and a desorption rate (ammonia slip) of ammonia stored in the SCR catalytic converter 5 and possibly further characteristics. The relevant data are thereby determined corresponding to the input variables on hand. The values characterizing an ammonia use, for example for the conversion with nitrogen oxides, the direct conversion with oxygen and the desorption rate given by the ammonia slip $S_{NH3}$ are supplied to a summation member 39 together with the supply rate Z of the ammonia supplied to the catalytic converter 5, which sums the corresponding variables in a prefix-correct manner. In this manner, a balancing for the variables is enabled, which essentially determine the ammonia amount stored in the catalyst 5. The summing is thereby carried out continuously preferably in specified time intervals in the millisecond region. The sum is supplied to an integration member 40, whose output variable represents the updated ammonia filling level F of the catalytic converter 5. Further output variables A are additionally determined from the data on hand. This are mainly magnitudes relating to the nitrogen content of the exhaust gas flowing from the catalytic converter, the ammonia slip $S_{NH3}$, and the exhaust gas temperature possibly changed due to the reaction heat or by heat losses.

The supply rate Z of the ammonia supplied to the catalytic converter 5 is amongst others determined by the urea dosing rate released via the dosing valve 27. It can thereby be provided to consider influences due to wall deposit and desorption. An ammonia release rate or hydrolysis rate derived from exhaust gas state variables can further be considered from the ammonia released by the supplied urea.

Corresponding to the above explanations, it is possible to operate the SCR catalytic converter 5 while using the shown ammonia filling level at least mainly with an ammonia filling level adjusted optimally to the respective conditions. It is thereby monitored continuously by the exhaust gas sensor 25, if or in which magnitude non-converted nitrogen oxides or an ammonia slip are present in the exhaust gas exiting from the SCR catalyst 5. Usually, the SCR exhaust gas aftertreatment system will work properly during the execution of the described normal operating mode, so that there is no cause for an intervention of the model or for an adjustment of model parameters. However, a case can occur that a deviation from the normal behavior occurs for example by drift appearances or changes of the SCR catalyst 5 caused by age, or by other initially unconsidered disturbances.

Figure 6A:
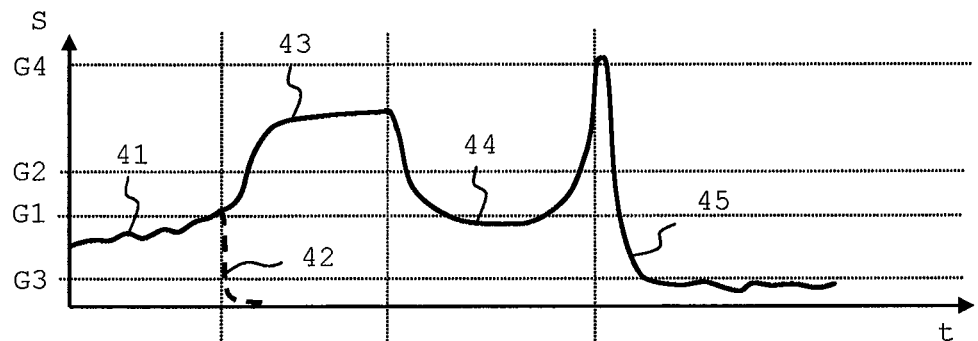
FIGS. 6a to 6d are time diagrams for exemplary time profiles for a signal S of an exhaust gas sensor associated with the SCR exhaust gas aftertreatment system with a sensitivity to nitrogen oxide and ammonia for a urea dosing rate D for the diagnostics of the SCR exhaust gas aftertreatment system, for a $NO_x$ untreated emission $NOx_{roh}$ of an internal combustion engine for the diagnostics of the SCR exhaust gas aftertreatment system and for a $NO_x$ conversion $U_{NOx}$ of the SCR exhaust gas aftertreatment system.
Figure 6B:
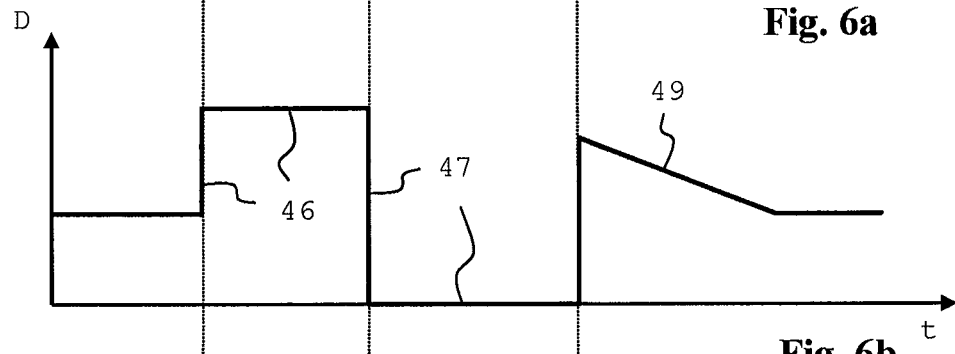
Figure 6C:
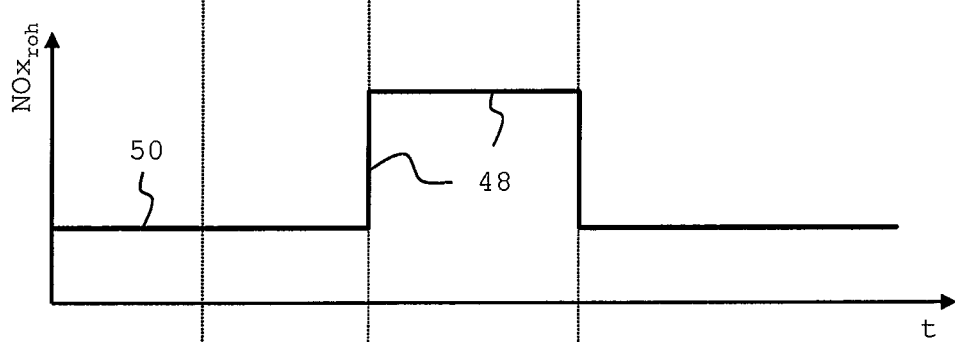
Figure 6D:
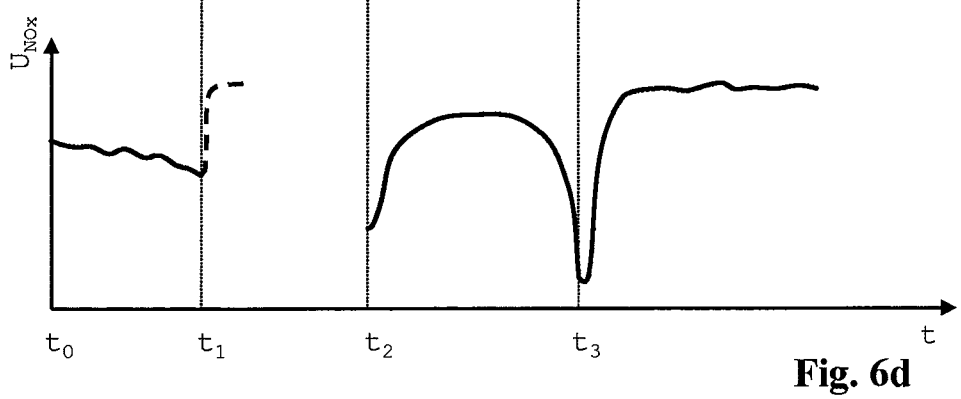

In the following, a preferred procedure for especially a diagnostics in such a case with regard to the time diagrams shown in FIGS. 6a to 6d is explained. Thereby, an exemplary profile of a signal S of the exhaust gas sensor 25 arranged on the output side of the SCR catalytic converter 5 with a sensitivity with regard to nitrogen oxides and ammonia is shown in FIG. 6a. In the diagrams of FIGS. 6b, 6c and 6d, corresponding chronological profiles of a urea dosing rate D, of a NOx raw emission $NOx_{roh}$ of the Diesel engine 1, and a nitrogen oxide conversion $U_{NOx}$ of the SCR catalytic converter 5 relating to the NOx raw emission $NOx_{roh}$ of the Diesel engine are plotted. It is thereby clear that profiles shown as constant can also be subject to natural fluctuations.

Starting from an arbitrarily chosen time $t_0$, it is assumed that a nominal value for a urea dosing rate D from the urea dosing device is set in such a manner that the ammonia filling level F of the SCR catalytic converter is kept within a predefined range or at least approximately takes on a predefined value according to the model. It is further first assumed that the nominal value for the urea dosing rate largely corresponds to the actual value, this is why it is called urea dosing rate in a simplified manner. By sensing the signal S of the exhaust gas sensor 25, which is assessed as concentration signal for the nitrogen oxide content of the exhaust gas on the output side of the SCR catalytic converter 5, and of the nitrogen oxide input concentration, obtained from the signal delivered from the nitrogen oxide sensor 20, or read out from engine operating characteristics, an updated nitrogen oxide conversion $U_{NOx}$ is determined. It is thereby preferably controlled, if the determined nitrogen oxide UNOx is correlated with the determined updated ammonia filling level F according to the model according to FIG. 4. Insofar, an adjustment or a mutual validation of parameters of the filling level model and measure-technologically sensed magnitudes and thereby a monitoring and diagnostics of the SCR exhaust gas aftertreatment system takes place during the normal operation. With excessive deviations, an adjustment of model parameters of the filling level model or a change-over into a diagnostic operating mode can be provided.

Presently, a normal behavior regarding this is assumed, as long as the signal S lies below a predefinable first limit value G1. If however, as shown by the curve branch 41, a gradual increase of the signal S results, which leads to an exceeding of the predefined first limit value G1 at the assumed time $t_1$, an anomaly of the SCR exhaust gas aftertreatment is diagnosed. As it is first not clear, on which cause the diagnosed anomaly is based, an error treatment routine is started according to the invention, which permits a limiting or identification of possible error sources. Especially, a check is initially provided if the exceeding of the first limit value G1 for the signal S of the exhaust gas sensor 25 is caused by an increased nitrogen oxide concentration or by an increased ammonia slip of the SCR catalytic converter 5. For this, the set urea dosing rate D is increased by a predefinable measure directly after exceeding the first limit value G1 at the time $t_1$, for example by the factor 2, as shown by the curve branch 46.

If a reaction to this within a predefinable period of for example several seconds results in a falling of the signal S below a predefinable third limit value G3, as clarified by the dashed curve branch 42 in FIG. 6a, it is verified thereby that an increased ammonia slip was not present, as the increase of the urea dosing rate D would have had to increase the ammonia slip in such a case due to the increased ammonia supply to the SCR catalytic converter 5 effected thereby. The falling of the signal rather has to be assessed in such a manner that an increased nitrogen oxide concentration was present, which was rectified by the increased ammonia supply with an increase of the ammonia filling level F of the SCR catalytic converter and thereby increased nitrogen oxide conversion $U_{NOx}$. It is thereby preferably preferred to set the third limit value G3 relatively low for a safe assessment in the mentioned sense, preferably approximately between 2 ppm and 20 ppm.

As a reaction of the falling of the exhaust gas sensor signal S to values below the third limity value G3, it is provided to return to the normal operating mode. One or several parameters of the filling level model and/or of the operating parameter are preferably adapted to the SCR exhaust gas aftertreatment system. It can for example be provided to correspondingly correct the updated present value. If the above anomaly occurs after some time, which can be predefined as control time, this can be interpreted as an error of the dosing system, for example in the form of an erroneously reduced dosing rate D, which can then be corrected. A further repetition of the anomaly can for example be interpretated as a malfunction of the dosing valve 27 and a corresponding message can be issued.

If successively to an adaptation of a parameter of the filling level model, a reduced NOx conversion $U_{NOx}$ and/or an increased ammonia slip is registered, this is preferably interpretated as a reduction of the catalytic activity of the SCR catalytic converter 5, and an issue of a corresponding error message can also be provided. The magnitude of the updated nitrogen oxide conversion UNOx can be assessed at any time and for example be adapted to the aging factor by comparison with the stored characteristics.

Going back to the diagrams of FIGS. 6a to 6d, the further procedure provided according to the invention is explained in the following, when, after the increase of the urea dosing rate D at the time t1 within a predefinable period an increase above a predefinable limit value G2 takes place instead of a fall of the signal S of the exhaust gas sensor 25 below the third limit value G3.

In this case, it is assumed that the sensor signal S increased at the time t1 can be ascribed to an increased ammonia slip. The SCR catalytic converter has thus reached its maximum ammonia filling level corresponding to the updated boundary conditions. The increase of the urea dosing rate D at the time t1 with a correspondingly increased ammonia supply leads to a further increased ammonia slip and thus to a further increase of the sensor signal caused by ammonia, which is outlined in an exemplary manner by the curve branch 43. Thereby, for a particularly reliable securing of the diagnostic result, the second limit value G2 can be given in dependence on the measure of the increase of the urea dosing rate D.

As a reaction to the exceeding of the second limit value G2, it is provided to change into a special diagnostic operating mode, which uses the time t2 after expiration of a verification period of for example about 10 seconds corresponding to the time t2 characterized in the diagrams. The nitrogen oxide raw emission $NOx_{roh}$ of the Diesel engine 1 is quickly increased in this diagnostic operating mode, and the urea dosing rate D is at least approximately reduced in a chronologically synchronous manner. The raw emission is preferably increased drastically and suddenly, for example at least by a factor 2 to 5, and the urea dosing is cut off completely, which is clarified by the curve branches 47 and 48. For increasing the nitrogen oxide raw emission $Nox_{roh}$ of the Diesel engine 1, all measures suitable for this are considered. A drastic reduction or a cutoff of the exhaust gas return is especially provided.

Due to the previously increased urea dosing rate D in the period between $t_1$ and $t_2$, it is ensued that the diagnostic operating mode enters the diagnostic operating mode with an ammonia filling level F of 100% and a maximum nitrogen oxide conversion $U_{Nox}$ under the other conditions. In this manner, the diagnostic operating mode is started with a distinct reference state. The cutoff of the urea supply thereby has the advantage that a defined state is also created with regard to this, which excludes a falsification by wrong dosing. The increase of the nitrogen oxide load of the SCR catalytic converter 5 again has the advantage that the state of excessive ammonia filling level F is ended quickly and is only present for a short time. It is further ensured that the signal S of the exhaust gas sensor 25 can be interpreted distinctly as caused by nitrogen oxide.

Due to boundary conditions created at the start of the diagnostic operating mode, typically a fall of the sensor signal S results initially due to the catalytic converter activity caused by the high ammonia filling level F and the inititally resulting comparably low nitrogen oxide concentration in the exhaust gas leaving the SCR catalytic converter 5. Due to the known reaction of ammonia stored in the SCR catalytic converter with supplied nitrogen oxide, the ammonia filling level F is reduced and thus inevitably the nitrogen oxide conversion $U_{NOx}$ and the nitrogen oxide in the exhaust gas leaving the SCR cattalytic converter 5 rises again. The sensor signal S thus typically passes through a minimum, which is characterized in the diagram of FIG. 6a by the exemplary outlined curve branch 44.

If the output signal S of the exhaust gas sensor 25 reaches a fourth limit value G4, which is for example the case at the time $t_3$, the diagnostic operating mode is ended and a return is made to the normal operating mode. The engine operation with increased nitrogen raw emission $NOx_{roh}$ is ended and a corresponding model-based urea dosing rate D is set corresponding to the achieved ammonia filling level F. The last can be comparatively large temporarily, but will approach a normal value corresponding to the given relations, which is outlined by an exemplary ramp-like profile of the curve branch 49. The nitrogen oxide conversion takes on a high value more or less quickly and the signal S significantly decreases as shown by the curve branch 45. The fourth limit value G4 determining the time $t_3$ can thereby be given by a certain nitrogen oxide conversion $U_{Nox}$ of for example 50%.

For diagnosing especially the SCR catalytic converter 5, it is further provided to calculate the total converted nitrogen oxide amount in the time interval from $t_2$ to $t_3$. This can for example take place by integration of the nitrogen oxide concentration in the exhaust gas on the output side of the SCR catalytic converter 5 and the nitrogen oxide input concentration, obtained from the signal supplied by the nitrogen oxide sensor 20 or read out from the engine operation characteristics. Alternatively or additionally the total converted ammonia amount and which is stored in the SCR catalytic converter 5 is calculated. The obtained values are compared to corresponding reference data determined from characteristics or characteristic lines for an unaged or limit-value aged catalytic converter. Due to the method process according to the invention, catalytic converter characteristics, which directly relate to the nitrogen oxide conversion and thus the catalytic converter activity, and also those relating to the ammonia capacity with reference values can be compared.

If the comparison shows that the SCR catalytic converter 5 is not damaged, or is damaged in an unessential manner, it is preferably provided to adjust one or several parameters of the filling level model and/or operating parameters of the SCR exhaust gas aftertreatment system. It can for example be provided to correct the urea dosing rate D to reduce the probability of an excessive ammonia slip occurring again. A correction factor can further be changed in the integration member 40 of the filling level determination unit 35. In this manner, a chronological "running away" of the integration can be avoided.

If a comparison of the catalytic converter characteristics obtained by the diagnostic operation with such an unaged or limit-value aged catalytic converter shows a deterioration with regard to its nitrogen oxide conversion activity or its ammonia storage capacity, the aging factor provided for considering the aging is set correspondingly as explained above. It can also be provided to determine a hypothetical active catalytic converter volume or a catalytic converter length, which gives a change of the SCR catalytic converter compared to a reference value for an unaged or a limit-value aged catalyst.

If the anomaly of an increased ammonia slip occurs again after taking a corresponding correction measure within a predefinable control time, it is preferably provided to reverse the corresponding correction measure and to take up another measure directed towards another possible error source.

In the following, the case is discussed that the exhaust gas sensor signal S neither increases over the second limit value G2 nor falls below the third limit value G3 after the increase of the urea dosing rate D at the time With a properly functioning urea dosing, a correspondingly clear reaction of the signal S in the profile can be expected with a clear and sudden increase of the urea dosing rate D. If the sensor signal S remains between the second limit value G2 and the third limit value G3 after applying corresponding settings for the urea dosing rate D, a malfunction is present in any case. According to the invention, a malfunction of the dosing system or of the urea dosing device is diagnosed as the most probable error. Due to the absence of an adequate reaction of the exhaust gas sensor 25 to the changed adjustment it is assumed that this has not taken action due to the failure of a component relating to the dosing. The failure can for example be a clogging or malfunction of the dosing valve 27 or the dosing pump. For a further localization of the error, the following measures can be provided, with which the operating state of these components is checked. The issue of an alarm with regard to a malfunctioning of the dosuing system of the urea dosing device is provided in any case to initiate a service.

It is generally provided to issue a corresponding alarm when identifying any critical malfunctioning state, wherein the identified error is specified if possible. It is thereby a particular advantage of the operating and diagnostic method according to the invention, that malfunctioning differentiation can already take place during a normal use of the motor vehicle at least to a certain extent. This simplifies the following service activities. A further advantage is a catalytic converter aging and an adjustment of the filling level model based thereon enabled due to the diagnostics. This enables a reliable and effective operation of the SCR exhaust gas aftertreatment system over long runtimes in relation to the exhaust gas cleaning.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating and diagnosing an internal combustion engine SCR exhaust gas aftertreatment system that has an SCR catalytic converter with ammonia storage capacity, and an exhaust gas sensor that is sensitive to nitrogen oxide and ammonia arranged downstream of the SCR catalytic converter; wherein the method comprising:
   measuring a signal of said exhaust gas sensor;
   operating the internal combustion engine SCR exhaust gas aftertreatment system in a normal operating mode by
      setting a urea dosing rate to a normal operating mode dosing rate;
      supplying ammonia to the SCR catalytic converter corresponding to a filling level model for ammonia stored in the SCR catalytic converter, in
   such a way that the ammonia filling level of the SCR catalytic converter is
   held at least at a predefinable nominal value or value range;
   detecting that the signal of the exhaust gas sensor exceeds a first predefinable limit value; and
      interrupting the normal operating mode of the internal combustion engine SCR exhaust gas aftertreatment system; and
      increasing the a urea dosing rate by a predefinable amount compared to the normal operating mode dosing rate;
   detecting, within a predefined period after increasing the urea dosing rate, that the signal of the exhaust gas sensor increases over a predefinable second limit value exceeding the first predefinable limit value within the predefinable period; and
      changing the operation of the internal combustion engine SCR exhaust gas aftertreatment system to a diagnostic operating mode, wherein the diagnostic operating mode includes
         controlling the internal combustion engine to produce an increased nitrogen oxide untreated emission compared to a nitrogen oxide untreated emission in normal operation of the internal combustion engine; and reducing the urea dosing rate in chronological synchronism to the increase of nitrogen oxide untreated emission or setting the urea dosing rate to zero.

2. The method according to claim 1, further comprising:
returning to the normal operating mode if the signal of the exhaust gas sensor falls below a predefinable third limit value lying below the first limit value within the predefinable period after the increase of the set urea dosing rate.

3. The method according to claim 2, further comprising:
diagnosing a malfunctioning urea dosing device if the signal of the exhaust gas sensor remains in a predefinable value range including the first limit value in the predefinable period.

4. The method according to claim 3, wherein the predefinable value range is limited by the second limit value at an upper end and by the third limit value at the a lower end.

5. The method according to claim 1, further comprising:
determining a catalytic converter characteristic characterizing an updated nitrogen conversion activity in the diagnostics operating mode.

6. The method according to claim 5, further comprising:
determining a deviation of the catalytic converter characteristic determined in the diagnostic mode from a predefined reference value; and
generating a malfunction message if the deviation is larger than a predefined difference value.

7. The method according to claim 6, further comprising:
ending the internal combustion engine operation with increased nitrogen oxide untreated emission and returning to the normal operating mode if the signal of the exhaust gas sensor exceeds a predefinable fourth limit value after the increase of the nitrogen oxide untreated emission.

* * * * *